UNITED STATES PATENT OFFICE.

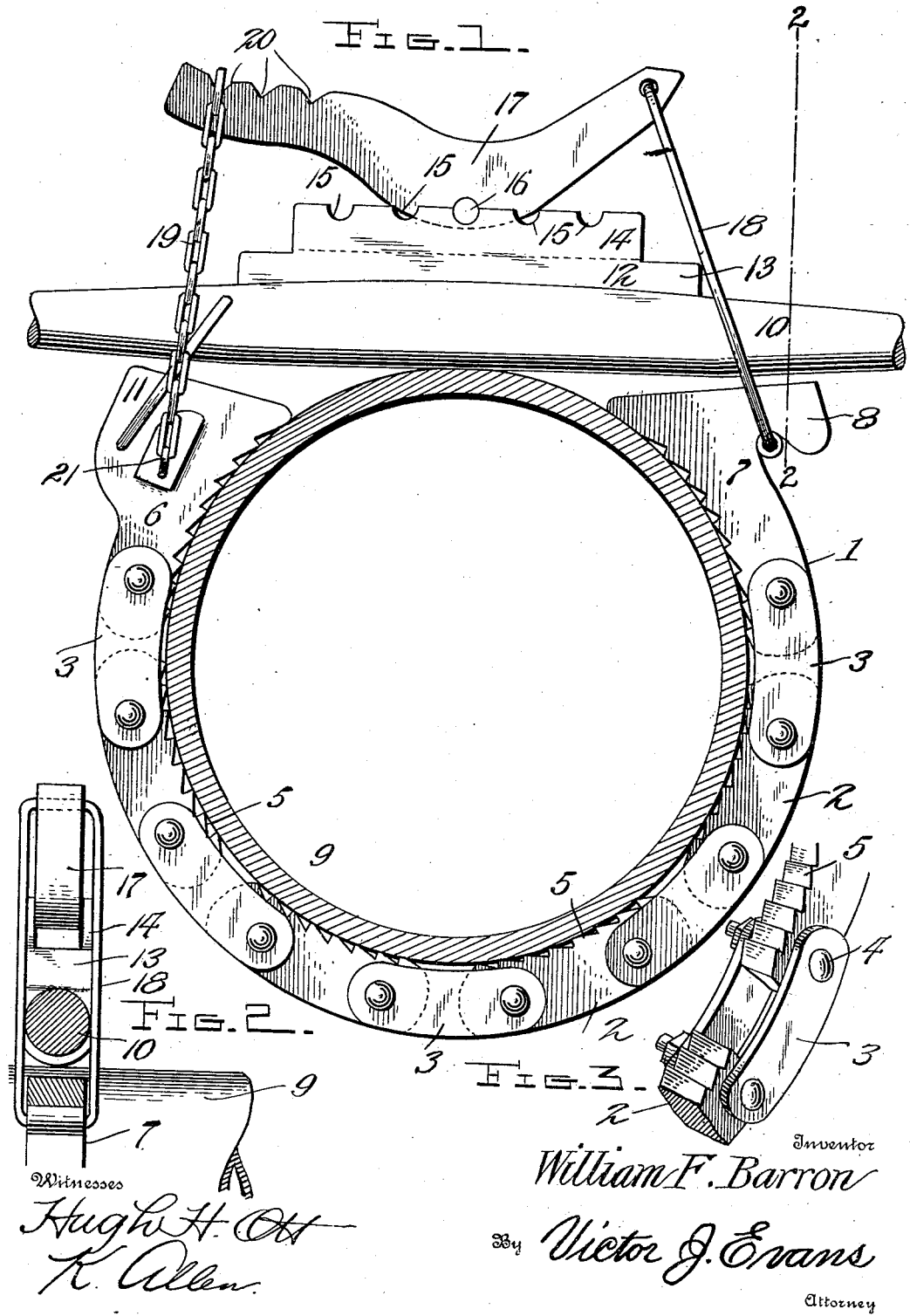

WILLIAM F. BARRON, OF JACKSONBURG, WEST VIRGINIA.

PIPE-GRIPPER.

No. 886,171.  Specification of Letters Patent.  Patented April 28, 1908.

Application filed January 14, 1908. Serial No. 410,859.

*To all whom it may concern:*

Be it known that I, WILLIAM F. BARRON, a citizen of the United States, residing at Jacksonburg, in the county of Wetzel and State of West Virginia, have invented new and useful Improvements in Pipe-Grippers, of which the following is a specification.

The invention relates to an improvement in pipe gripping means designed primarily for gripping a pipe section in a manner to permit its convenient operation in assembling the pipe sections to form a well casing.

The main object of the present invention is the production of a pipe gripping member constructed for convenient application to the pipe section and adapted when in place to so grip and engage the pipe as to permit convenient turning or handling of the same when screwing or otherwise assembling said pipe section with the other pipe sections of a well casing.

The invention will be described in the following specification, reference being had particularly to the accompanying drawings, in which:—

Figure 1 is an elevation illustrating my improved gripping means, a pipe length being shown in section. Fig. 2 is a section on the line 2—2 of Fig. 1. Fig. 3 is a detail perspective illustrating the chain formation.

Referring particularly to the accompanying drawings, my improved pipe gripper includes a gripping member 1 made up of a series of solid links 2 and open links 3, the latter preferably comprising spaced plates of duplicate construction arranged to receive the terminals of the solid links between them. The links are arranged in alternate order, being pivotally connected to each other through the medium of bolts 4, which extend through plates of an open link and through the terminal of a solid link arranged between said plates, the bolt extending beyond the outermost plate and being threaded for the reception of a nut or other convenient fastener, whereby any one or more links of the gripping member may be readily and conveniently removed to either renew the same or to vary the length of the gripper in accordance with the diameter of the pipe section being handled.

The relatively inner or pipe engaging surfaces of the solid links are formed with a series of teeth or serrations 5, whereby to cause an effective gripping of the pipe surface in the operation of the gripper, and in this connection it is to be understood that the links arranged on one side of a diametric line of the pipe have their teeth extending in one direction, while those arranged on the opposite side of said line have their teeth extending in the opposite direction, whereby a single gripper provides for conveniently gripping the pipe in operating the gripper in either direction. The end links of the gripper are of somewhat greater length than the remaining links, both said end links being solid and one, as 6, being materially thickened while the other, as 7, is formed with a hook projection 8. The terminal links 6 and 7 are also toothed or serrated on their inner or bearing surfaces and are adapted to at all times form the terminals of the gripper, the increase or decrease in length of the latter being effected by adding or subtracting the requisite number of links between the terminal links.

The pipe section 9, with which the gripper coöperates, is to be operated by a bar 10, as is usual in assembling the pipe sections. For the purposes of the present invention I connect one terminal link, as 6, to the bar 10 at an appropriate point in the length of the latter, through the medium of a link 11, the connection being a comparatively loose one and having no particular function other than supporting the gripper from the bar in a position to be conveniently used at all times. Secured upon the bar 10 at a point preferably midlength the latter is what I term a saddle 12, comprising a solid base 13 fixed on the bar and upwardly projecting spaced parallel plates 14, the latter extending longitudinally of the bar, as clearly shown in Fig. 1. The upper or free edges of the plates 14 are notched at 15, said notches being arranged in transversely alined pairs and spaced throughout the length of the plates, being designed for the reception of a pivot pin 16 projecting from an approximately L-shaped lever 17, which is of a thickness to fit between the plates 14, as shown in Fig. 2. By this construction it is obvious that the lever is pivotally supported on the saddle 12 and may be adjusted longitudinally of the saddle to dispose the pivot in either of the transversely alined recesses 15 desired.

In use the gripping member, formed of an appropriate number of links, is passed about the pipe, the bar 10 resting upon the surface of the pipe and transverse the length thereof, as shown. The terminal link 7 is connected to the lever 17, after mounting the latter in the appropriate pivot bearings in the saddle, through the medium of a link 18 movably mounted in one end of the lever 17 and having its opposite end formed to engage the hook 8 of the link 7. As the link 11 loosely connects the opposing terminal link 6 to the bar 10, it is obvious that the gripper is thus held about the pipe section 9, and that it is only necessary to tighten the same to permit the desired operation of said section. This tightening or adjustment is secured through the medium of a chain 19, which is terminally connected to the link 6 of the gripper, and is adapted to be passed over and engaged in one or the other of a series of recesses 20 formed in the end of the lever 17 opposite the connection of the link 18, the recesses being, of course, formed in the relatively upper edge of the lever. The chain after being passed over the lever is returned to the link 6 and, after being drawn on to tighten the same, is connected to a hook 21 or other attachment projecting from said link, preferably on the side opposite the fixed connection of the chain thereto.

The tightening of the chain as described tends to rock the lever 17 on its pivot with the effect to tighten the gripping member about the pipe section in an effectual manner, and permit any of the usual operations in assembling said pipe section with the remaining pipe sections.

The invention is primarily designed as a means for conveniently operating otherwise unwieldy pipe sections when assembling said sections to form a well casing. In this use it is, of course, understood that the respective pipe sections are connected together by screwing one within the other, and that each section is supported by a derrick and lowered into position to be connected to the immediately lower section of the well casing. With the pipe section supported by the derrick and lowered in position, the gripper of the present invention is applied, and after connection as described the uprights by turning the pipe section through use of the bar 10 may readily and conveniently connect the particular section in place. The invention is particularly designed for this purpose, though it will be at once apparent that it is obviously serviceable for other and varied uses, and it is to be understood that all of such uses are contemplated in the present invention.

Having thus described the invention what is claimed as new is:—

1. A gripping member including alternately arranged solid and open links, and means for detachably connecting the links, the links on opposite sides of the center of the member having oppositely effective gripping surfaces.

2. A pipe gripper including an operating bar, a gripping member movably connected to the bar, a saddle carried by the bar, a lever having an adjustable pivotal connection with the saddle, and independent means for connecting each end of the member to the respective ends of the lever.

3. A pipe gripper including an operating bar, a gripping member movably connected to the bar, a saddle carried by the bar, a lever having an adjustable pivotal connection with the saddle, and means for connecting the respective ends of the member to the ends of the lever, one of said connections being adjustable with relation to the pivotal support of the lever.

4. A pipe gripper including an operating bar, a gripping member connected with the bar, a saddle connected to the bar, a lever having an adjustable pivotal connection with the saddle, a link connecting one end of the lever with one end of the member, and a chain connecting the opposite end of the member with the remaining end of the lever.

5. A pipe gripper including an operating bar, a gripping member connected with the bar, a saddle connected to the bar, a lever having an adjustable pivotal connection with the saddle, a link connecting one end of the lever with one end of the member, and a chain connecting the opposite end of the member with the remaining end of the lever, said lever being formed with a series of notches respectively designed to receive the chain.

In testimony whereof I affix my signature in presence of two witnesses.

WILLIAM F. BARRON.

Witnesses:
C. L. JOHNSTON,
H. R. JOHNSTON.